Dec. 23, 1941.                C. SAURER                2,267,172
                          RESILIENT MOUNTING
                        Filed May 17, 1938         2 Sheets-Sheet 1
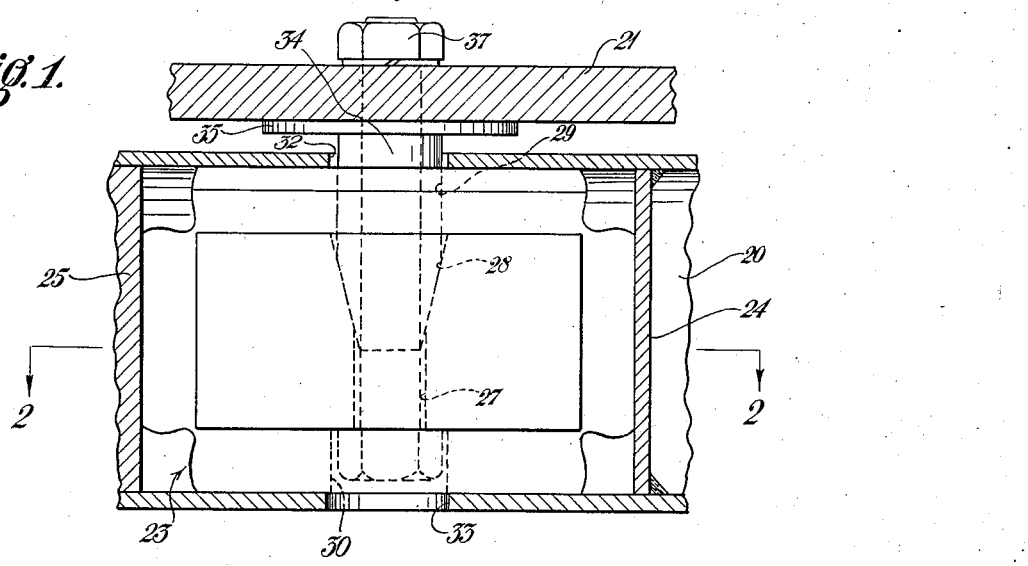
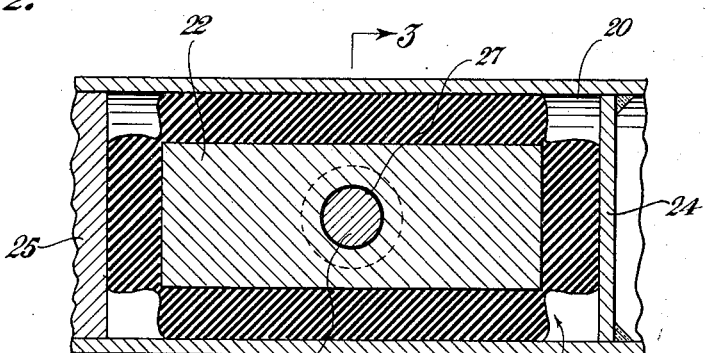
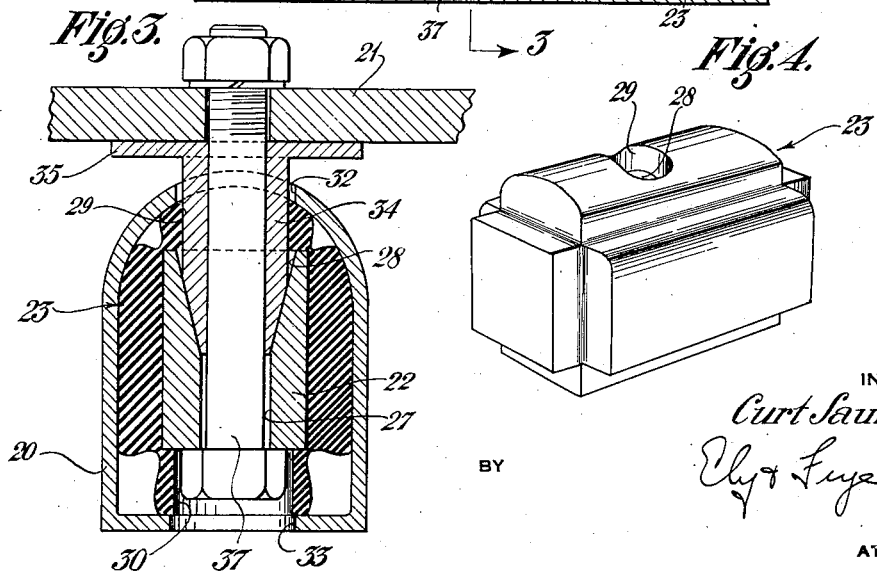
INVENTOR
Curt Saurer
BY
ATTORNEY Dec. 23, 1941.  C. SAURER  2,267,172
RESILIENT MOUNTING
Filed May 17, 1938   2 Sheets-Sheet 2
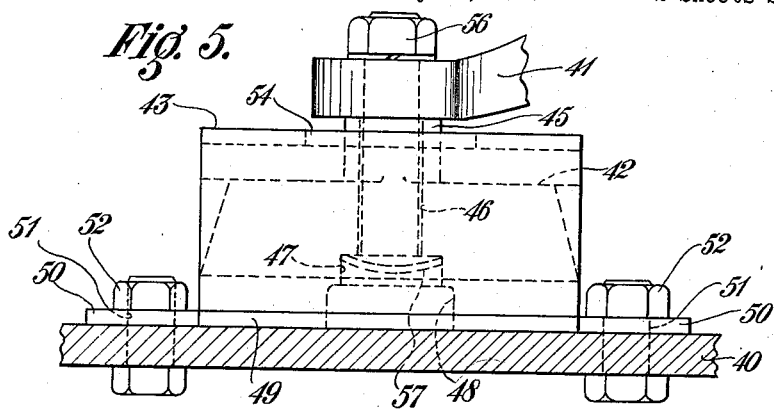
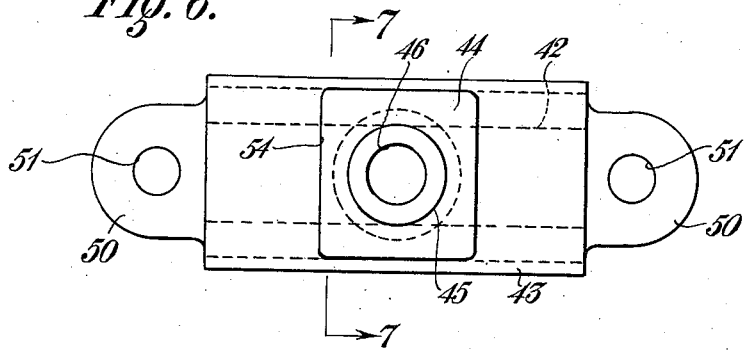
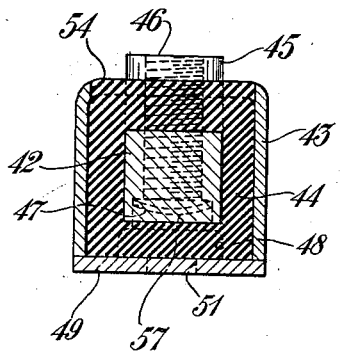
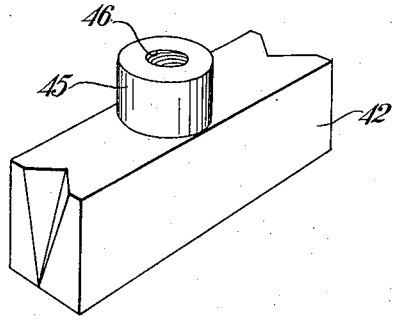
INVENTOR
Curt Saurer
BY
ATTORNEY Patented Dec. 23, 1941

2,267,172

UNITED STATES PATENT OFFICE 2,267,172

RESILIENT MOUNTING

Curt Saurer, Akron, Ohio, assignor to The Firestone Tire & Rubber Company, Akron, Ohio, a corporation of Ohio Application May 17, 1938, Serial No. 208,417

2 Claims. (Cl. 248—22)

This invention relates to resilient mountings, and more especially it relates to yielding structures that may be interposed between two bodies, of which one body at least is a vibratory body, for suppressing the translation of vibration between said bodies.

The improved mounting is especially adapted for use in motor vehicles, and may be used between the motor or engine and its supporting structure, or between the longitudinal and the transverse members of the frame or the body of the vehicle.

The chief objects of the invention are to provide an improved resilient mounting of the character mentioned; and to provide a resilient mounting that may be mounted in a number of different ways to control relative movement between two bodies in one or more directions while enabling substantial freedom of movement in other directions. Other objects will be manifest as the specification proceeds.

Of the accompanying drawings:

Figure 1 is a side elevation of one embodiment of the invention in operative association with a supporting and a supported structure, said structures being shown in section;

Figure 2 is a section on the line 2—2 of Figure 1;

Figure 3 is a section on the line 3—3 of Figure 2;

Figure 4 is a perspective view of the resilient element of the mounting;

Figure 5 is a side elevation of another embodiment of the invention, in operative association with a supporting and a supported structure;

Figure 6 is a plan view of the embodiment shown in Figure 5;

Figure 7 is a section on the line 7—7 of Figure 6; and

Figure 8 is a perspective view of the internal metal element of the mounting.

Referring now to Figures 1 to 4 of the drawings, there is shown a tubular supporting structure 20 which may be a portion of the frame or body of a motor vehicle, and a supported structure 21 that may be a portion of the motor or engine of the vehicle. Positioned interiorly of the tubular structure 20 is a resilient unit comprising an elongate metal core 22 that is square in section, and has a covering of resilient rubber composition, generally designated 23, that is bonded thereto, as by vulcanization. As shown best in Figure 4, the rubber covering on the core 22 is in the form of a plurality of rectangular blocks that are of such length and breadth as to be substantially coextensive with the respective lateral and end faces of the core. As shown in Figure 3, the upper side of the frame member 20 is substantially semi-circular in transverse section, and the corresponding side of the rubber covering 23 of core 22 is similarly shaped. The thickness of the core-cover 23 is such that when the core is mounted within the structure 20, said cover will be under appreciable compressive stress. There is a transverse partition 24 in the tubular structure 20 that is permanently secured therein as by welding, and the core structure is forced against said partition, as it is being mounted in the structure 20, to put the rubber at one end of the core under compressive stress. A second partition member 25 subsequently is forced against the other end of the core structure to put the rubber thereat under compressive stress, the member 25 usually being a portion of the body or frame to which the adjacent end of the structure 20 is secured.

The metal core 22 is formed with centrally disposed, vertical bore 27 that is flared from its medial region to its upper end, as shown at 28, and the rubber covering 23 is apertured at top and bottom, at 29, 30 respectively, coaxially of bore 27 and of a diameter at least as great as the large diameter of the flared portion 28. The top and bottom walls of tubular frame structure 20 are apertured at 32, 33 respectively, and the resilient unit is mounted in the said frame structure with bores 27, 28 and apertures 29, 30 in axial alignment with apertures 32, 33. The supported member 21 is arranged to be connected to the supporting member 20 solely through the agency of the resilient unit described, and to this end a tubular sleeve 34 is provided, said sleeve having a flange 35 at one end, the other end of the sleeve being tapered complemental to the flared portion 28 of bore 27. The sleeve 34 is arranged to extend through aperture 32 in the body member 20 so that its tapered end portion seats in the tapered bore in core 22, and when so arranged the sleeve-flange 35 is spaced somewhat above the member 20. The supported member 21 seats upon the flange 35, and is secured to the resilient unit by a bolt 37 that extends through the supported member, the sleeve 34, and the core 22, the head of said bolt being disposed in the aperture 30 in the rubber covering on the bottom face of said core. The aperture 33 in the bottom of the member 20 enables the bolt 37 to be inserted in the assembled structure. The aperture 32 in the top of member 20 is sufficiently larger in diameter than the sleeve 34 to enable movement of the latter, relatively of the said member 20.

The invention is such that movement of either the supported or supporting member, either longitudinally, transversely or vertically, relatively of the other member, will be yieldingly opposed by the resistance to further compression of the rubber of the core-cover 23. The feature of having the core-cover 23 consist of rubber blocks that are substantially co-extensive with the several sides of the metal core provides the recessed corners of the resilient unit, which recesses enable displacement of the rubber of the blocks in four directions when said blocks are subjected to compressive stress.

In the embodiment of the invention shown in Figures 5 to 8, inclusive, the supporting member is designated 40 and the supported member 41. The resilient mounting interposed between said members and which both are connected to comprises a rectangular metal core 42 of square cross-section, a metal cage or casing 43 encompassing the four sides thereof, and a cushion of resilient rubber composition 44 between the said core and said casing. As shown in Figure 8, the core 42 is centrally formed on the top face thereof with an integral cylindrical boss 45, and the core is formed with a threaded bore 46 that is concentric with the axis of said boss. The bore 46 is counterbored at 47 in the bottom face of the core, and a dished metal insert 57 is mounted in said counterbore to exclude rubber therefrom when the rubber cushion 44 is molded onto the core. Encasing the four lateral faces of the core 42, but not the ends thereof, is the cushion 44 of resilient rubber composition, said cushion being bonded to the core by vulcanization. Said cushion is recessed at 48 in its bottom, which recess is somewhat larger than the counterbore 47 and concentric with the latter. The casing 43 is a three-sided trough-like structure that embraces the top and two lateral faces of the rubber cushion 44, and is bonded thereto by vulcanization of the rubber. The said casing comprises a bottom plate 49 that is welded to the lateral margins of the structure 43 after the core 42 and cushion 44 have been vulcanized thereinto. The bottom plate 49 is formed with ears 50, 50 that extend beyond the ends of casing 43 and are apertured at 51 to receive respective bolts 52 by means of which the mounting is secured to the supporting member 40. The medial portion of the casing 43, which is the top thereof, is centrally apertured at 54, said aperture extending the entire width of the casing, and being square in contour. The boss 45 of the core 42 extends through aperture 54 to a point somewhat above the top of the casing, and the rubber cushion extends through the same aperture, and is flush with the top of the casing.

Threaded into bore 46 is a cap screw 56, which cap screw provides the means for connecting the supported member 41 to the core 42, said supported member resting upon the projecting upper end of boss 45. The arrangement is such that lateral movement and up and down movement of the core 42 relatively of the casing 43 is resisted by the resistance of the rubber cushion 44 to compression. There is less resistance to relative longitudinal movement of the core 42, such movement being opposed mainly by the resistance to shear of the rubber. The recess 48 in the bottom of the rubber cushion 44 and the aperture 54 in the top of the casing 43 enable deformation and displacement of the cushion rubber when under stress. The mounting offers differential resistance to deformation in different directions so that it is able to control relative movement between the supporting and supported members in one or more directions while permitting relative freedom of movement in another direction. The wedge shaped recesses in the opposite ends of the core 42 have no function in the operation of the mounting and are employed only to obtain proper positioning of the core while the rubber cushion 44 is being vulcanized thereto.

Other modification may be resorted to without departing from the spirit of the invention, or the scope thereof as defined by the appended claims.

What is claimed is:

1. A resilient mounting for use between two relatively movable members, said mounting comprising a metallic core structure that is a quadrilateral prism in shape, a body of rubber bonded thereto, said rubber body comprising rectangular blocks having linear dimensions co-extensive with the lateral faces and end faces of the core, a casing structure surrounding the outer surfaces of said rubber body, constituting one of said relatively movable members and leaving voids between the core and casing into which portions of said rubber body may be displaced, said casing body being formed with an aperture, and means extending through said aperture for connecting the core to the other relatively movable member.

2. A resilient mounting for use between two relatively movable members, said mounting comprising a metallic core structure of quadrilateral prism shape, a body of rubber bonded thereto, said rubber body comprising substantially separate rectangular blocks that cover all of the faces of said core, a casing structure surrounding and in engagement with the outer faces of said rubber body, said rectangular rubber blocks all extending only the length of the faces of said core so that voids are formed at the edges of said core between same and said casing to accommodate flow of the rubber, said casing constituting one of said relatively movable members and having an aperture formed therein, and means extending through said aperture for connecting said core to the other relatively movable member.

CURT SAURER.